Figure 5:
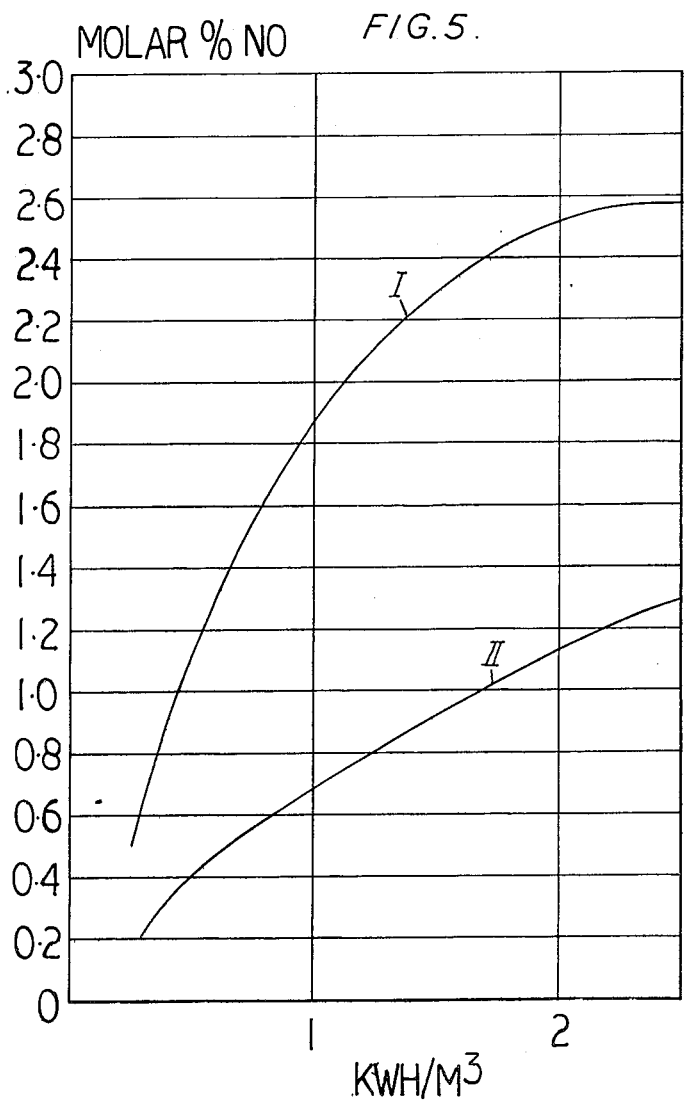

Aug. 14, 1962  K. JACKSON ETAL  3,049,488
METHOD OF CONDUCTING GASEOUS CHEMICAL REACTIONS
Filed Jan. 11, 1960  3 Sheets-Sheet 1
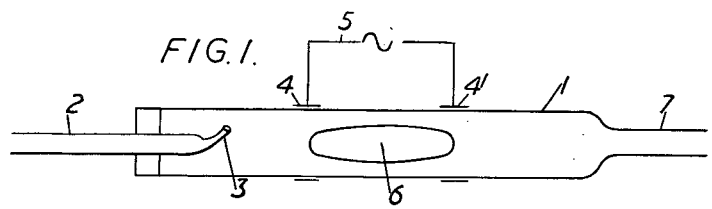
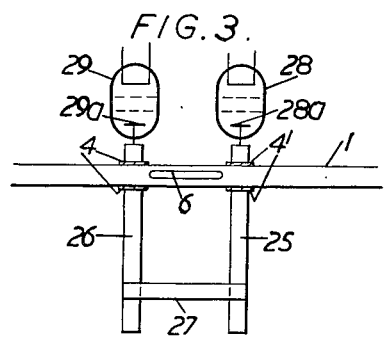
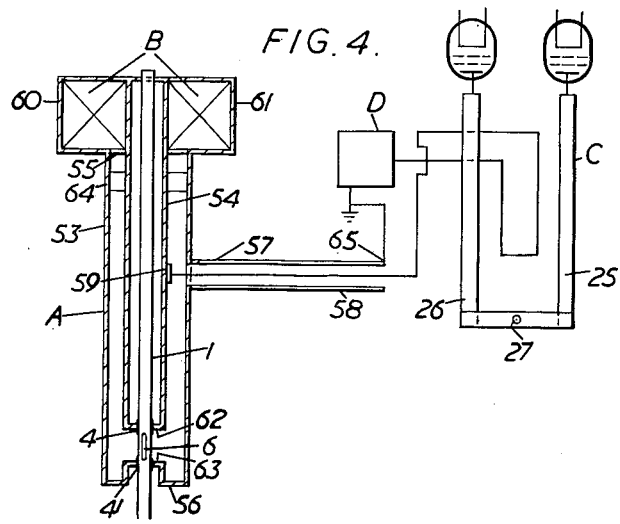
Inventors:
Kenneth Jackson,
Martin S. Bloom,
By
Cushman, Darby & Cushman
Attorneys.

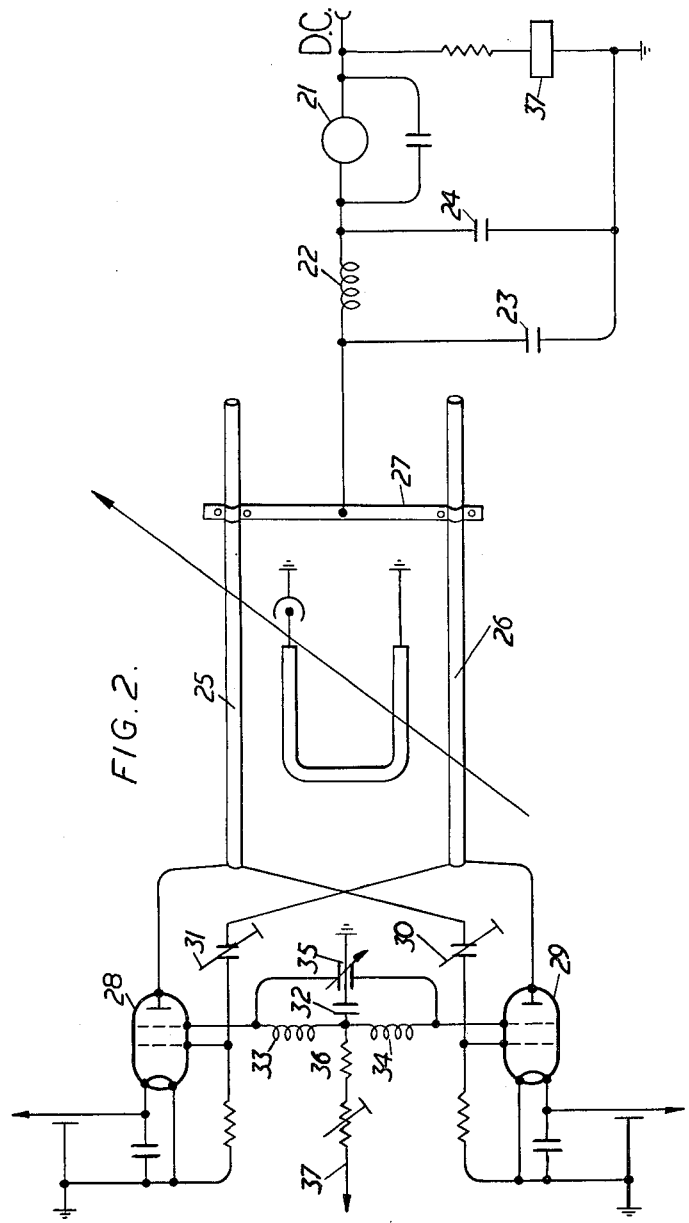

3,049,488
METHOD OF CONDUCTING GASEOUS CHEMICAL REACTIONS
Kenneth Jackson and Martin S. Bloom, Norton-on-Tees, England, assignors to Imperial Chemical Industries Limited, London, England, a corporation of Great Britain
Filed Jan. 11, 1960, Ser. No. 1,548
Claims priority, application Great Britain Jan. 12, 1959
14 Claims. (Cl. 204—312)

The present invention relates to the conducting of gaseous chemical reactions.

While of wide application, it is of special value in relation to conducting gaseous reactions of inorganic species especially such reactions of endothermic character.

According to the present invention gaseous reactions, for example, of inorganic species, are conducted at absolute pressures preferably in excess of 40 cms. of mercury by introducing the said species into a domain bounded by solid dielectric surfaces within which domain there is established an alternating electric field of radio frequency; initiating an electric discharge in this electric field; arranging that the discharge plasma is confined in the said domain so that the said dielectric surfaces are kept at relatively moderate temperature; removing the products from the said domain; and quenching them, the said electric field being produced by conductors near or in contact with the exterior of the said solid dielectric surfaces. In a prefererd form of the invention the process is operated continuously, and then the gaseous species are flowed through the domain, and the said conductors are spaced the one from the other preferably along the line of flow of the gas, so that the electric field produced is parallel to the direction of gas flow. The object of keeping the temperature of the surfaces moderate is to prevent both their physical deterioration and their becoming conducting and thus absorbing energy from the alternating field.

In an important form of the invention all the reactant species are introduced to and passed through the domain.

In another important form of the invention one or more of the reactant species are introduced into the domain and the activated product is quickly brought into contact with at least one other reactant species, whereby reaction between them is brought about, and the products are thereafter quenched. One application of this form of the process is to reactions involving organic compounds such as hydrocarbons, in which an active species is jetted into the hydrocarbon.

In the second method of operation quick contact of the activated product with the other reactant or reactants may be brought about, for example, by providing a constriction in the tube at or just beyond the second conductor.

It is desirable that the dielectric should have the following properties over the temperature range 0° to 1000° C. or higher, (a) Low electrical conductivity to minimise dissipation of energy in, and decrease heating of, the dielectric;
(b) Low dielectric loss at radio frequency, e.g. 150 megacycles to minimise energy losses;
(c) High heat transfer so that the dielectric temperature is decreased;
(d) Transparency to radiant heat in order to decrease heating of the boundary regions by the discharge;
(e) Preferably, optical transparency for observational purposes; and
(f) Under circumstances to be described, rigidity, so that low and high pressure gas streams can be passed through the tube and thin walls, minimising the dielectric loss can be used.

A particularly suitable material is transparent fused quartz. Borosilicate glass may also be used but does not stand up to such high temperatures as fused quartz.

Radio frequencies of 10 to 200, or even higher, e.g. 3000, megacycles are suitable for the practice of the invention.

When the process is operated continuously a very useful method of operation is to employ a cylindrical tube of a dielectric, such as transparent fused quartz, for example, of 0.05 to 2 inch diameter, in which is situated the said domain, and to introduce the gaseous species through a delivery tube entering into the said cylindrical tube, reaching nearly to the first conductor, and provided at the end with a projecting nose of narrower diameter of the nature of a jet and directed angularly towards the walls of the cylindrical tube, in such manner that the entering gases are caused to move through the cylindrical tube in a substantially helical path, forming a kind of vortex. This results on the one hand in the walls being kept at moderate temperatures, and on the other in the plasma formed by the discharge being confined more or less centrally in the cylinder. The vortex motion of the gas in the discharge zone can be achieved alternatively by arranging that the gas enters the tube by tangential slots, or by providing oriented vanes in the zone. The tubes feeding the gas to the slots may be at right angles to the direction of the long axis of the tube or may be inclined to that direction.

Instead of using the above described angularly disposed jet, the gaseous reactants could be introduced through an ordinary delivery tube, and there could be provided an end annular opening to the cylinder through which gas, either reactant or inert, could be introduced so as to achieve the results of keeping the walls cool and of confining the plasma centrally to the cylinder.

If desired the outer walls of the domain may be provided with a jacket and cooled by circulating a liquid having a low dielectric loss at radio frequency through the jacket, e.g. a mineral oil such as transformer oil.

A very usfeul form of conductor is a capacity coupling ring.

An alternative method of controlling the plasma centrally, and thus of largely safeguarding the walls, would be to apply a magnetic field to the plasma. Depending on the desired end this could be used to focus the discharge plasma so as to concentrate it, or else to deform it into other desirable configurations.

The domain has been described above as constituted of a cylindrical tube of solid dielectric, but other forms may be used, for example a cylindrical tube expanded centrally into a spherical shape, or with any other suitably shaped expanded portion. Then the conductors can be disposed on or near the exterior surfaces of the expanded portion, the one above, the other below, the axis of the tube. If desired instead of a cylindrical tube there may be used vessels having walls which taper either outwardly or inwardly, relative to the axis.

The process of the invention is applicable to the reaction of nitrogen and oxygen to yield nitric oxide for conversion to nitric acid. Then air or any desired mixtures of the two gases may form the reactant mixture. Using air, pass yields of 4% and more have been obtained. However, it may also be applied to other reactions including organic reactions. Among the reactions to which the invention may be applied are the production of hydrazine from nitrogen and hydrogen, or hydroxylamine from nitrogen, hydrogen and oxygen, and the production of hydrogen cyanide from nitrogen and a hydrocarbon, for example methane.

A suitable apparatus for producing nitric oxide by the process of the invention is shown in FIGURE 1 of the drawings. Air at atmospheric pressure is introduced through the delivery tube 2 to the quartz tube 1 of about 2 cm. diameter fitted with two copper rings 4 and 4'. These are connected to a 150 megacycle power source 5 which affords an "electrodeless" discharge 6. The discharge is initiated by first flowing air through at a sufficiently low pressure to give a glow discharge and thereafter gradually raising the pressure to atmospheric or higher, whereupon the discharge maintains itself. A suitable air flow rate is, for example, 200 litres/hour.

It is advantageous to form the delivery tube with a short nose 3 of narrower diameter pointing at an angle with respect to, and towards, the walls of the tube 1. In this way the latter are prevented from becoming too hot and the discharge is kept near the centre of the tube, possibly owing to the incoming gas pursuing a helical path. The products are removed through the constricted tube 7 and are quenched.

Under the above conditions at molar concentrations of 1.4% NO, 50 gms. of nitric acid/kilowatt hour are produced.

Flow rates at which the discharge has been maintained using 500 watt, 150 megacycles power are approximately 8000 litres/hour in an 0.5 cm. I.D. quartz tube. Similar flow rates have been achieved in a 2 cm. I.D. quartz tube. The maximum flow rate increases with increase of power input. The inlet velocity and inlet tube position must be carefully adjusted so as to avoid blowing out the discharge.

To obtain in the present process the alternating electric field which affords the discharge, it is preferred to use a coaxial resonator. Furthermore, it is preferred to use a re-entrant coaxial resonator because loss of electromagnetic energy at the above defined high frequencies is thereby substantially eliminated. Such a resonator is described in copending U.S. application Serial No. 804,024. The preferred form of obtaining the electric field is to surround the dielectric on its exterior surface at suitable points with two conducting tubes, for example of copper or other good R.F. conductor.

The resonator may be formed of any material having a continuous conducting surface, for example brass, copper, silver, or of ordinary metals or other materials having a coating of high electrical conductivity.

FIGURE 3 shows schematically one method of connecting the radio frequency generator to the conductors. In this 1 represents the cylindrical tube fitted with external conductors 4, 4', conveniently circular bands of copper or brass in close contact with the tube 1 and connected in the manner shown in FIGURE 3 to the anodes 29a and 28a of valves 29, 28. (25, 26) is a twin conductor line, whose length can be adjusted by means of the movable tuning bar 27. 6 indicates the discharge.

A suitable generator of the high voltage alternating field is shown in FIGURE 2. Direct current is supplied through a meter 21 and a radio frequency filter comprising, for example, a choke 22 and capacitors 23 and 24 to a resonant circuit comprising an adjustable length of balanced twin conductor transmission line (25, 26). The effective length of this transmission line can be adjusted by means of the movable tuning bar 27.

This line presents a high impedance to the oscillator anodes of the valves 28 and 29 at the resonant frequency of the line 25, 26. Radio frequency voltage at this resonant frequency appearing on the anode of valve 28 is coupled to the grid of valve 29 by the capacitor 30. Similarly radio frequency voltage appearing on the anode of valve 29 is coupled to the grid of valve 28 by the capacitor 31. Feedback through the capacitors 30 and 31 is positive and causes valves 28 and 29 to maintain an oscillation at the frequency set by the transmission line 25, 26, in conjunction with the capacities and inductances of valves 28 and 29. Alteration of the frequency of oscillation is obtained by adjusting the tuning bar 27 on the line 25, 26. Capacitor 32 in conjunction with resistor 36 by-passes radio frequency current flowing in the screen grid circuit. Capacitor 35 and inductors 33 and 34 form a screen grid neutralising circuit.

Relay 37 ensures that the screen supply to valves 28 and 29 is not applied without the anode supply, thus safeguarding the valves.

In the forms of the invention described with reference to FIGURES 1 and 3, control of the shape and position of the discharge plasma is exercised primarily by means of the main gas stream or auxiliary gas streams, but it has been mentioned that control may also be exercised magnetically. One method of magnetic control will now be described with reference to FIGURE 4.

In this A is a resonator, especially a coaxial resonator of re-entrant type, in the gap of which is situated the reaction tube 1; B is an electro magnet; C is a radio frequency generator, e.g. of the sort already described; and D is an impedance matching circuit.

The resonator shown comprises two coaxial cylindrical conductors 53 and 54, of which the outer 53 has closed ends; one end of the inner 54 is connected to the outer at 55; and the other end of 54 in conjunction with the projection 63 of 53 constitutes the conductors for forming the alternating field. The elements of A shown in FIGURE 4 as hatched, including those of the coaxial resonator, are of a ferromagnetic material such as high permeability steel. Elements 53, 54 and 56 are plated with a metal of high electrical conductivity, such as copper, silver, gold, platinum, and thus provied along with the ring conductors 4 and 4', for example of copper, but preferably of platinum, the electrical path in the resonator which affords the discharge 6. The magnetic flux used to control the shape of the discharge 6 flows between the pole formed by the end 62 of the central conductor 54 and the projection 63 on the end 56 of the outer conductor 53.

The high frequency input line 58 is connected to the central conductor 54 of the resonator via a movable contact 59, which may be a wiper contact insulated from the outer conductor 53 and slidable in a slot in the latter. The screen of the coaxial cable 57/58 is connected to the outer conductor 53.

To enable the discharge to be run under varying conditions, e.g. gas pressure, length of discharge path, gas compositions, and at the same time with the most efficient utilisation of power, it is desirable to match the load impedance at the terminal 59 to the characteristic impedance of the transmission line 57/58 and that of the generator to that of the transmission line 65. The impedance matching at the load end is accomplished by adjustment of sliding tap 59 and of adjustable short circuiting plunger 64, which is a solid ring of highly conducting metal.

The method of conducting a run with the above apparatus exercising magnetic control is as follows. The radio frequency generator and matching circuits are adjusted so as to produce a large electric field strength in the discharge region. The discharge tube is evacuated until a glow discharge starts. Adjustment of the impedance matching to give optimum discharge intensity and to display the usual criteria for radio frequency oscillators is made at the radio frequency generator end with the matching circuit and by means of the sliding tap 59 in the re-entrant resonator. The gas pressure is then increased to the level desired and further adjustments of the impedance matching are made as before to give the desired utilisation of electrical power.

In the air gap 62/63, D.C. or A.C. magnetic fields controlled by a variable transformer feeding the rectified supply and having a mean value of up to 5000 oersteds in the region of the discharge may be applied. Any changes in discharge impedance which are caused by the magnetic field may be compensated by minor adjustments of the impedance matching devices as before.

Advantages of using a re-entrant coaxial resonator of the above type along with magnetic control are:

(a) There is efficient application of the electric fields;

(b) There is efficient application of the magnetic fields;
(c) There is no interaction between the electric and magnetic field forming devices, and
(d) Water cooling and other service lines going through the central conductor 54 do not need to be electrically insulated.

The process of the invention can be used also at superatmospheric pressure, e.g. up to 500 atmospheres or more, the upper limit being determined by the strength of available materials of construction. Under such conditions the use of a re-entrant coaxial resonator is preferred. This is enclosed within a pressure resistant envelope, through which the necessary gas and electrical connections pass. The pressure resistant envelope may be, for example, of steel or of nickel chrome steel.

In the following examples, flow rates are in liters per hour (l./hr.).

EXAMPLE 1

This relates to the production of nitric oxide from air.

In Table 1 are shown typical conditions and the yields obtained (expressed as gms. $HNO_3$/kwh. of R.F. energy). Results designated "R" were obtained with apparatus comprising a re-entrant coaxial resonator; results not so designated were obtained with apparatus of the type illustrated in FIGURE 1 of the drawings. The table includes a comparison of results with and without vortexing motion of the gas stream and FIGURE 5 of the drawings illustrates these results further. Curve I being for circumferential flow and curve II for axial flow operation. These show clearly the advantage of imparting a vortexing motion to the gas stream. The amount of power used was measured calorimetrically.

Table 1

| Air injection system | Discharge tube diameter | Air flow Rate (l./hr.) | Discharge pressure (Atm. Abs.) | Molar percent NO in Exit gas | Gms. $HNO_3$/ kwh. |
|---|---|---|---|---|---|
| Circumferential flow | 2.0 | 70 | 1 | 2.60 | 28.2 |
| Axial flow | 2.0 | 70 | 1 | 1.49 | 16.1 |
| Circumferential flow | 2.0 | 212 | 1 | 2.34 | 38.4 |
| Axial flow | 2.0 | 212 | 1 | 0.9 | 14.8 |
| Circumferential flow | 2.0 | 643 | 1 | 0.8 | 67.8 |
| Axial flow | 2.0 | 643 | 1 | 0.31 | 26.1 |
| Circumferential flow (R) | 0.8 | 200 | 1 | 2.28 | 43.5 |
| Do | 0.8 | 200 | 2 | 2.49 | 46.5 |
| Circumferential flow | 0.1 | 100 | 1 | 3.2 | 42 |
| Do | 0.1 | 25 | 1 | 5.0 | 16.5 |

EXAMPLE 2

This illustrates the production of hydrazine from ammonia gas. Using the discharge in an ammonia gas stream in the quartz tube system, illustrated in FIGURE 1 of the drawings, hydrazine is produced in the exit gas stream as shown in Table 2.

Table 2

| Gas injection system | Discharge tube diam. (cm.) | Gas flow Rate (l./hour) | Gas Composition | Discharge pressure (atm. abs.) | Molar percent Hydrazine in exit gas | Gm. $N_2H_4$/ kwh. |
|---|---|---|---|---|---|---|
| Circumferential flow. | 2.0 | 450 | 100% $NH_3$ | 1 | 0.0024 | 0.45 |
| Do | 2.0 | 300 | 50% $NH_3$, 50% $N_2$. | 1 | 0.005 | 0.67 |

EXAMPLE 3

This illustrates the production of hydrazine from ammonia gas and active nitrogen formed in the "electrodeless" discharge.

Using the electrodeless discharge in a nitrogen gas stream with circumferential jet injection in the quartz tube system described previously, hydrazine is formed when the nitrogen exit gases are rapidly mixed with cold ammonia gas. In the following examples a constriction in the tube downstream of the discharge was used to accelerate the nitrogen gas to the point of mixing.

Table 3

| Discharge tube diameter (cm.) | Nitrogen Gas Flow Rate, l./hr. | Ammonia Gas Flow Rate, l./hr. | Discharge pressure (atm. abs.) | Molar Percent Hydrazine in exit gas | Gms. $N_2H_4$/ kwh. |
|---|---|---|---|---|---|
| 0.5 | 145 | 300 | 1 | 0.019 | 0.42 |
| 0.5 | 145 | 2,560 | 1 | 0.014 | 1.84 |
| 0.5 | 145 | 1,070 | 1 | 0.020 | 1.15 |

EXAMPLE 4

This illustrates the production of hydrogen cyanide from methane and active nitrogen formed in the "electrodeless" discharge.

Activated nitrogen produced by the action of the electrodeless discharge on nitrogen gas, when mixed with methane gas forms HCN. In the following examples methane was injected via an axial quartz tube into the nitrogen gas leaving the discharge region.

Table 4

| Nitrogen gas injection system | Discharge tube Diameter (cm.) | Nitrogen Gas flow Rate (l./hr.) | Methane Gas flow Rate (l./hr.) | Discharge pressure (atm. abs.) | Molar Percent HCN in exit gases | Gms. HCN/ kwh. produced |
|---|---|---|---|---|---|---|
| Circumferential flow | 0.3 | 343 | 115 | 1 | 0.22 | 16.5 |
| Do | 0.3 | 343 | 97 | 1 | 0.22 | 16.0 |

What is claimed:

1. Apparatus for conducting gaseous chemical reactions comprising a tube, gas inlet means leading into said tube, product outlet means leading from said tube, said tube having walls of a material which over the operating range has low electrical conductivity, low dielectric loss at radio frequency, good heat transfer, good transparency to radiant heat, and rigidity, a re-entrant coaxial resonator, two conductors external to said tube and operatively connected to said resonator, a radio frequency generator, means feeding the output of said generator to the resonator, the said conductors creating, when operative, an alternating electric field of radio frequency which affords a discharge within the tube.

2. Apparatus as set forth in claim 1 in which said tube comprises the hollow cylindrical inner member of a coaxial resonator comprising two coaxial cylindrical conductors, the outer of said cylindrical conductors having closed ends, means connecting one end of the inner cylindrical conductor to one end of the outer cylindrical conductor, the other end of the inner cylindrical conductor carrying one of said field creating conductors, the second field creating conductor being connected to the other end of the outer cylindrical conductor.

3. Apparatus as claimed in claim 1 in which the tube is cylindrical.

4. Apparatus as claimed in claim 1 in which said gas inlet means includes a delivery tube for the reactants having its exit in proximity to the first conductor and is for a portion of its length angularly directed towards the wall of the tube, whereby the entering gases move through the tube in a substantially helical path, forming a kind of vortex.

5. Apparatus as claimed in claim 4 in which the said portion of the delivery tube is a projecting nose of narrow diameter.

6. Apparatus as claimed in claim 1 in which there are tangential slots for entry of the reactant gas.

7. Apparatus as claimed in claim 1 in which the walls of the tube are provided with a jacket for circulation of a coolant having a low dielectric loss at radio frequency.

8. Apparatus as claimed in claim 1 in which there is beyond the second conductor a reaction zone provided with at least one delivery tube for further reactant.

9. Apparatus as claimed in claim 1 in which there is a constriction in the tube beyond but in close proximity to the second conductor.

10. Apparatus as claimed in claim 1 in which the said conductors are capacity coupling rings.

11. Apparatus as claimed in claim 1 in which there is magnetic means external to the tube for controlling the configuration and position of plasma formed within said tube during operation of the apparatus.

12. Apparatus as claimed in claim 1 in which there is in the circuit comprising the re-entrant coaxial resonator and the radio frequency generator, an impedance matching circuit.

13. Apparatus as claimed in claim 1 in which the said dielectric is transparent fused quartz.

14. Apparatus for conducting gaseous chemical reactions comprising a tube, gas inlet means leading into said tube, product outlet means leading from said tube, said tube having walls of a material which over the operating range has low electrical conductivity, low dielectric loss at radio frequency, good heat transfer, good transparency to radiant heat and rigidity, a coaxial resonator, two conductors external to said tube and operatively connected to said resonator, a radio frequency generator, means feeding the output of said generator to the resonator, the said conductors creating, when operative, an alternating electric field of radio frequency which affords a discharge within the tube.

References Cited in the file of this patent
UNITED STATES PATENTS

| | | |
|---|---|---|
| 1,063,760 | Zenneck et al. | June 3, 1913 |
| 2,257,177 | Luster | Sept. 30, 1941 |
| 2,709,192 | Farlow | May 24, 1955 |
| 2,985,573 | Cherrier et al. | May 23, 1961 |

FOREIGN PATENTS

| | | |
|---|---|---|
| 16,636 | Great Britain | of 1911 |
| 301,930 | Great Britain | Nov. 28, 1929 |